United States Patent [19]

Robby

[11] Patent Number: 5,786,751

[45] Date of Patent: Jul. 28, 1998

[54] SYSTEM FOR MONITORING ALIGNMENT OF WHEELS USING A PHOTOELECTRIC SENSOR

[75] Inventor: Guy M. Robby, Saratoga, Calif.

[73] Assignee: Aydius, Inc., Santa Clara, Calif.

[21] Appl. No.: 549,424

[22] Filed: Oct. 27, 1995

[51] Int. Cl.⁶ .................................................. B60Q 1/00
[52] U.S. Cl. .................. 340/438; 340/440; 33/286; 33/203.18; 280/661
[58] Field of Search ........................ 340/438, 440; 33/288, 286, 336, 203.18, 337; 364/424.01; 280/96.1, 99, 661; 356/155

[56] References Cited

U.S. PATENT DOCUMENTS

| | | | |
|---|---|---|---|
| 2,672,597 | 3/1954 | Ritch, Jr. | 340/52 |
| 3,438,646 | 4/1969 | Hannapel | 280/87 |
| 3,597,728 | 8/1971 | Kurtz | 340/52 |
| 3,963,352 | 6/1976 | Rishovd et al. | 33/336 |
| 4,029,337 | 6/1977 | Bishop | 280/661 |
| 5,143,400 | 9/1992 | Miller et al. | 280/661 |
| 5,292,149 | 3/1994 | Luger | 281/661 |

*Primary Examiner*—Jeffery Hofsass
*Assistant Examiner*—Anh La

*Attorney, Agent, or Firm*—Hickman Beyer & Weaver

[57] ABSTRACT

A system for monitoring the alignment of the wheels, such as the front wheels, that control the steering of a vehicle is provided. The system includes a pair of alignment sensing devices that extend between each steering arm and a tie rod coupled to the arm, of the vehicle's steering assembly. The sensing devices include a pair of concentric tubes retained in a slidable relationship and an alignment sensing system. After the wheels are aligned, the tubes are coupled to the steering assembly and are slid relative to each other, until the sensing system indicates that the tubes are aligned, thus indicating that the wheels are aligned. The sensing system is activated whenever desired by an operator of the vehicle. The sensing system provides a first signal to indicate that the front wheels are aligned and a second signal to indicate that the front wheels are not aligned. Alignment is verified when the operator rotates a steering wheel of the vehicle in a desired direction until the front wheels are rotated fully in the direction. The sensing system is then activated. The operator then rotates the steering wheel in the other direction, until the front wheels are positioned fully in the remaining direction. During or after the front wheels are being positioned in the remaining direction, the sensing system provides either the first signal to indicate that the front wheels are aligned or the second signal to indicate that the front wheels are not aligned.

16 Claims, 3 Drawing Sheets

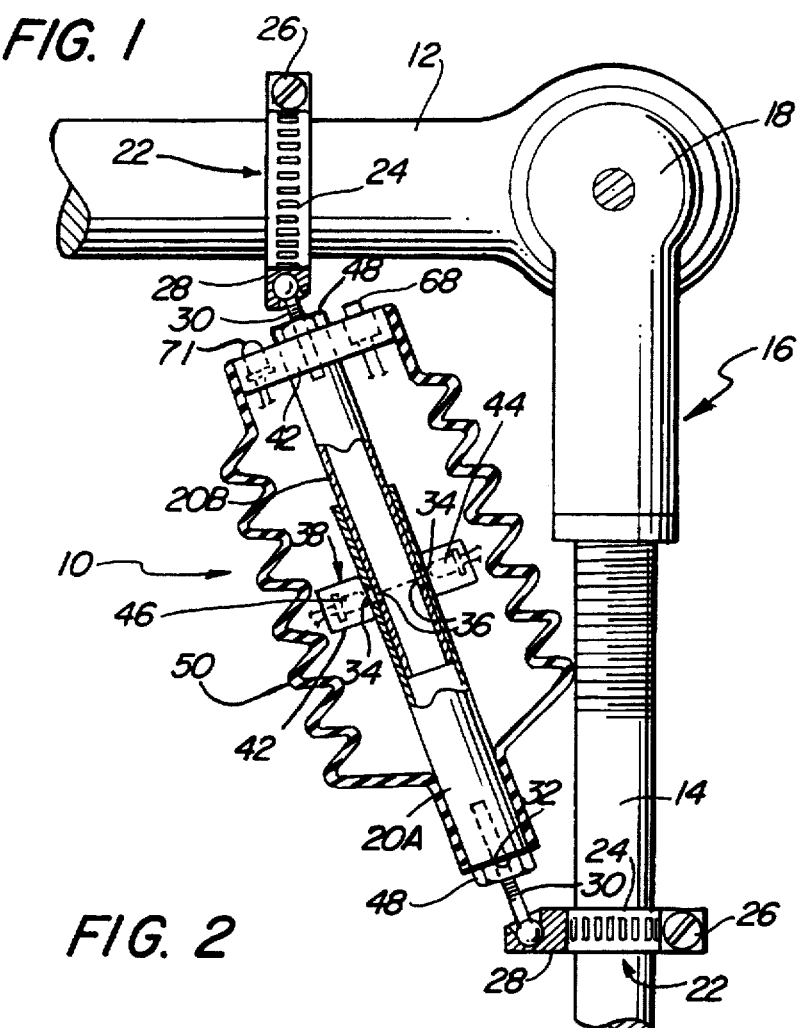
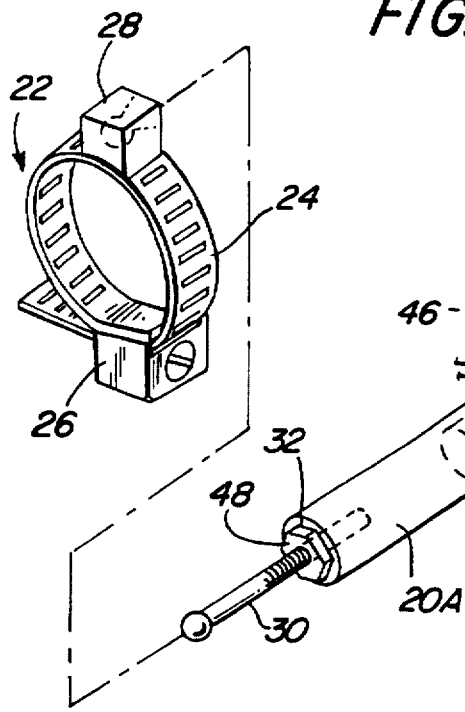
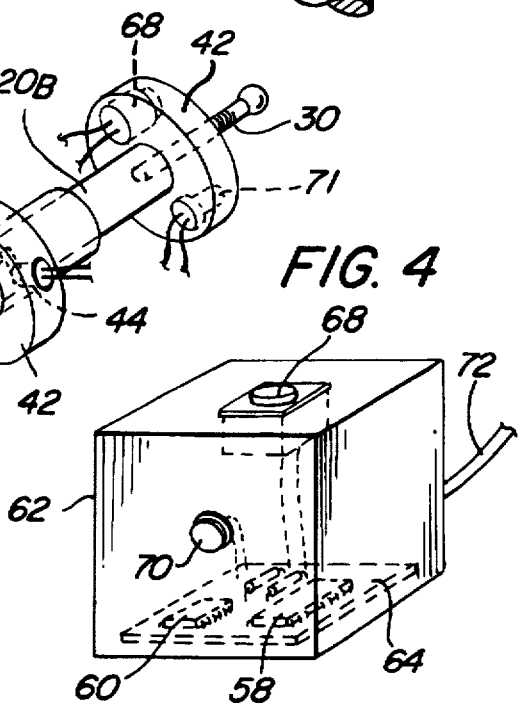

SYSTEM FOR MONITORING ALIGNMENT OF WHEELS USING A PHOTOELECTRIC SENSOR

BACKGROUND OF THE INVENTION

1. Field of the Invention

The present invention relates generally to devices used to align the front wheels of a vehicle, and more particularly, to a system for monitoring the alignment of a vehicle's front wheels that enables the operator of the vehicle to monitor the alignment of the vehicle's front wheels.

2. Description of Related Art

Maintaining proper alignment of a vehicle's front wheels is substantially important. When the front wheels are not properly aligned, the tires mounted on the wheels typically wear on either the outermost or innermost portion of the tire, causing the tires to wear out rapidly. Further, when the front wheels are not in alignment, the vehicle has a tendency to pull to either the right or left, when driving the vehicle. If the operator of the vehicle is not fully concentrating on the vehicle's direction, the vehicle may drift towards oncoming traffic or may drift off the road, potentially causing harm to both the operator and the vehicle.

However, the operator of the vehicle is not always aware that the vehicle is out of alignment, if the vehicle does not pull dramatically to either side for example. Thus, over time tires mounted on the front wheels may wear out prematurely without the operator's knowledge. Therefore, a system that could indicate to the operator the alignment condition of the front wheels would be advantageous.

A device for indicating a change in alignment of the front wheels is disclosed in U.S. Pat. No. 3,438,646, to M. Hannapel. The disclosed structure includes a pair of attachments that are mounted inwardly of the front wheels of an automobile. The attachments include electro-magnetic means that are calibrated corresponding to a proper setting of the sweep of the automobiles wheels. When a wheel is out of alignment, the corresponding electro-magnetic means produces an electrical impulse greater than the electrical impulse produced by the in-alignment wheel. The electrical impulses are conducted to indicating means, such as a pair of ammeters. The driver of the automobile depresses a switch for activating the ammeters to determine if the wheels are out of alignment. A disadvantage of the disclosed device is that it is substantially complex to install on an existing vehicle due to its numerous components. A further disadvantage of the disclosed device is, that it appears to require replacing some of the components of the vehicle's steering assembly.

There, therefore exists a need for a system that enables the operator of the vehicle to monitor the alignment of the vehicle's front wheels and which provides substantially facile installation.

OBJECTS OF THE INVENTION

It is therefore an object of the present invention to provide a system for monitoring the alignment of a vehicle's front wheels;

It is another object of the present invention to provide a system for monitoring the alignment of a vehicle's front wheels that enables the operator of the vehicle to intermittently check the alignment of the vehicle's front wheels;

It is a further object of the present invention to provide a system for monitoring the alignment of a vehicle's front wheels that provides facile coupling of the system to the vehicle's steering assembly;

It is still another object of the present invention to provide a system for monitoring the alignment of a vehicle's front wheels that is not continuously active; and It is yet a further object of the present invention to provide a system for monitoring the alignment of a vehicle's front wheels that provides electronic indication of the alignment condition of the front wheels.

SUMMARY OF THE INVENTION

These and other objects and advantages of the present invention are achieved by providing a system for monitoring the alignment of the front wheels of a vehicle. The system couples to a vehicle's steering assembly that typically includes a pair of steering arms that are movably coupled at either end thereof to a steering tie rod and to a front wheel, for simultaneously changing the direction of the front wheels of the vehicle.

The invented system includes a pair of alignment sensing devices that extend between each steering arm and the tie rod coupled to the arm. Each sensing device comprises a pair of concentric tubes that are retained in a slidable relationship. The tubes are slidably coupled together to accommodate the changing distance between the steering arm and tie rod as the vehicle is being driven. Means may be provided to prevent the tubes from rotating relative to each other. One of the tubes is coupled to the steering arm and the remaining tube is coupled to the adjacent tie rod. Each of the tubes may have a pair of diametrically opposed apertures disposed therethrough. The apertures can be aligned for forming a channel that extends through the tubes.

Adjustment means are affixed to at least one of the tubes of each sensing device. The adjustment means are provided for longitudinally adjusting the tubes to an initial position, where the apertures are aligned and the channel is formed. The adjustment means may be provided with a locking member to aid with retaining the tubes in the initial position.

An alignment sensing system is coupled to the sensing devices. The sensing system includes signal emitting means and signal detection means coupled to each sensing device. The emitting means is coupled to the outer periphery of an outer tube of each device and positioned over one of the apertures. The detection means is also coupled to the outer periphery of the outer tube and positioned over the remaining aperture.

In an alternative embodiment, the sensing system may comprise a known device capable of producing a magnetic field, for example. The device may have a first component for producing the magnetic field secured to the inner periphery of the one of the tubes and a second component for detecting the field secured to the inner periphery of the remaining tube, for sensing when the tubes are out of alignment. If the alignment sensing system is secured inside of the tubes, apertures would not be formed through the tubes. In a further alternative embodiment, an electrical, electro-mechanical, or mechanical switch means may be secured to the inner periphery of one of the tubes and activation means would be secured to the inner periphery of the other tube. The switch means and activation means would be installed and operated using well known methods.

A monitor module is coupled to the alignment sensing system for activating the system. The module includes a normally open switch that is coupled to a power source. The power source may be either the vehicle's battery or a battery contained in the invented system. The switch is coupled to an electronic monitor means, such as a suitable integrated circuit device. The monitor means is coupled to each of the detection means for receiving the signal therefrom. When the switch is closed, the monitor means activates each emitting means for simultaneously transmitting a signal into the aperture it is positioned over and through the channel, if the apertures are aligned. If the apertures are aligned, the detection means are activated by the emitting means and transmit a second signal to the monitor means.

The monitor module further includes indicating means coupled to the monitor means. The indicating means preferably comprises a light emitting diode (LED) that is capable of emitting both green and red light. Alternatively, the indicating means may comprise a pair of LEDs, such as a green LED and a red LED. The indicating means provides a first indication, by preferably emitting green light, to indicate that the sensing system is active and to indicate that the first indicating signal is received from the monitor means and the front wheels are aligned. The indicating means also provides a second indication, by preferably emitting red light, to indicate that the second indicating signal is received from the monitor means and the front wheels are out of alignment.

Test means for determining if the apertures are aligned when the sensing devices are installed may be provided with each device. The test means would be secured to one of the tubes and electronically coupled to the emitting means and detection means. The test means would activate the emitting means for transmitting the signal for detection by the detection means. The test means are coupled to the detection means to receive the second signal therefrom. The test means receive the second signal from the detection means to indicate that the apertures in the tubes are aligned. Thus, proper installation and initialization of the sensing devices can be assured.

The invented alignment monitoring system is initialized by first adjusting the steering assembly, until the front wheels are aligned. A sensing device is then coupled between each steering arm and the adjacent tie rod. The tubes of each sensing device are then longitudinally adjusted until the apertures are aligned, to correspond to the aligned condition of the front wheels. The alignment of the apertures can be verified using the test means. A locking member is then tightened against at least one of the tubes, to prevent the tubes from inadvertently going out of alignment. The vehicle is then operated as desired. While the vehicle is being driven, the tubes are constantly sliding relative to each other due to the changing distance between the steering arm and tie rod, caused by steering the vehicle.

If the operator of the vehicle wishes to verify that the front wheels of the vehicle are still aligned, the operator first positions the vehicle on a level surface. The steering wheel is then rotated in either a clockwise or counterclockwise direction, to rotate the front wheels in the desired direction, until the front wheels are positioned substantially left or right. The switch is closed to activate the monitor means, for activating the emitting means. The detection means are not immediately activated by the emitting means, since the tubes of one of the devices are slid substantially outwardly relative to each other and the tubes of the remaining device are slid substantially inwardly relative to each other. The steering wheel is then rotated in the opposite direction for changing the front wheels from the position of substantially left or right to the remaining position.

As the front wheels are being rotated, the steering arms cause the tubes of each device to slide relative to each other. As the tubes are sliding, at some point the apertures will begin coming into alignment. As soon as the apertures are aligned sufficiently to at least partially form the channel, the detection means are activated by the signal transmitted through the channel from the emitting means. Upon activation, each detection means transmits the second signal to the monitor means. The monitor means determines if the signals were simultaneously received from the detection means and continues to sense the second signal transmitted from each detection means.

As the wheels continue to rotate, the apertures become more aligned until the channel is substantially formed and the apertures are in their initial position. The front wheels continue to be rotated until they are fully in the remaining position. As the wheels are rotated, the tubes of the devices are slid relative to each other until the apertures are drawn out of alignment and the channel closes. Once the channel closes, each detection means is no longer activated by its associated emitting means, and terminates transmission of the second signal to the monitor means. The monitor means determines if the signals from the detection means were simultaneously terminated.

If the signal from each of the detection means is simultaneously received, sensed, and terminated, as determined by the monitor means, then the apertures in each of the devices are simultaneously aligned, and therefore the front wheels are aligned. If the second signal is received from one of the detection means, prior to receiving the second signal from the other detection means, or if the transmission of the signal is not simultaneously terminated by each detection means, then the apertures in the devices are not simultaneously aligned, and the front wheels are out of alignment.

Thus, if the second signal from each detection means is simultaneously received, sensed, and terminated, as determined by the monitor means, the monitor means transmits a first signal to the LED, that causes the LED to emit green light, indicating that the front wheels are aligned. If the second signal from both detection means is not simultaneously received or terminated, or both, then the monitor means transmits a second signal to the LED, that causes the LED to emit red light, indicating that the front wheels are out of alignment, and the alignment condition of the front wheels should be checked by an alignment professional. Thus, the operator of the vehicle can check the alignment condition of the vehicle whenever it is desired, therefore reducing abnormal tire wear and unsafe vehicle operating conditions.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

FIG. 1 is a top plan, fragmentary view of a steering assembly with an alignment sensing device, shown in cross-section, of the preferred embodiment of the system of the present invention coupled thereto;

FIG. 2 is a perspective view of the alignment sensing device of the preferred embodiment and securing means for securing the sensing device to the steering assembly;

FIG. 4 is a perspective view of an activation system of the preferred embodiment of the present invention with a portion of the alignment sensing circuit retained therein shown in phantom.

DESCRIPTION OF THE PREFERRED EMBODIMENTS

Figure 3:
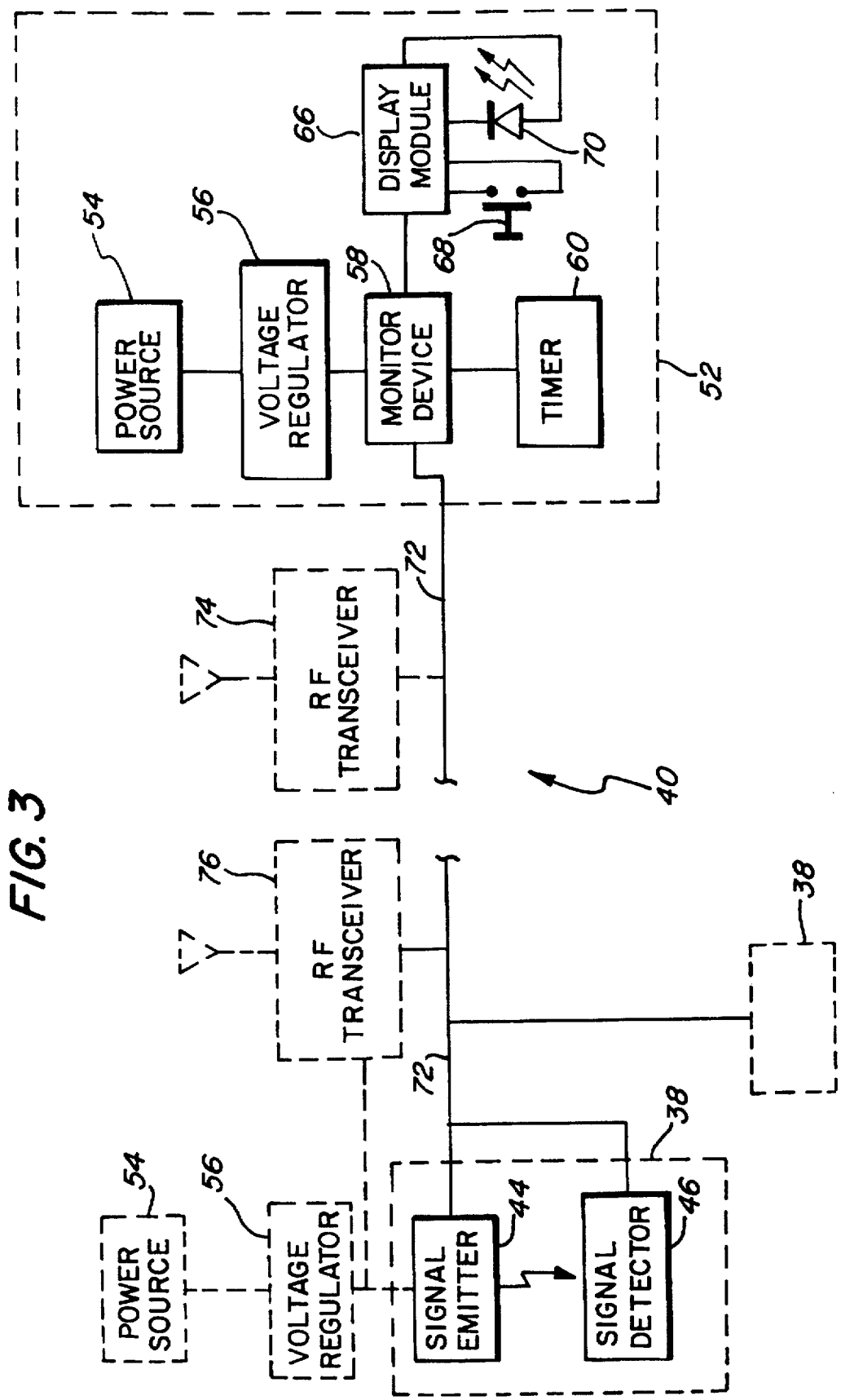
FIG. 3 is a block diagram of an alignment sensing circuit of the present invention.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein to provide a system for monitoring the alignment condition of a vehicle's front wheels on a production basis.

Referring now to FIG. 1 of the drawings, there is shown generally at 10 an alignment sensing device of a system for monitoring the alignment condition of a vehicle's front wheels constructed according to the principles of the present invention. The sensing device 10 is secured to a steering arm 12 and to a steering tie rod 14 of vehicle's steering assembly 16.

While only a portion of the steering assembly 16 is shown, such as the portion of the assembly 16 for controlling the direction of a left front left wheel it is to be understood that the portion of the assembly 16 for controlling the right front right wheel (neither front wheel is shown) is substantially that as shown in the drawing figure. The steering assembly 16 typically includes a pair of such steering arms 12 and at least one such tie rod 14 depending upon the configuration of the assembly 16. The tie rod 14 is movably secured to the steering arm 12 with a ball joint 18 as is well known. The tie rod 14 is oscillated either leftwardly or rightwardly to move the steering arm 12 for steering the vehicle.

Additionally, it is to be understood that while only a single alignment sensing device 10 is shown secured to the assembly 16, an additional alignment sensing device 10 of the present invention is secured to the steering arm and tie rod of the portion of the assembly 16 for controlling the front right wheel. Therefore, a pair of the invented alignment sensing devices 10 of the present invention must be secured to the steering assembly 16 to obtain all of the advantageous features of the invented system.

Referring now to FIG. 1 and FIG. 2 of the drawings, each sensing device 10 includes a pair of concentric tubes, comprising an outer tube 20A and an inner tube 20B that are retained in a slidable relationship. A desired one of the tubes, such as the inner tube 20B is coupled to the steering arm 12 and the remaining tube, such as the outer tube 20A is coupled to the adjacent tie rod 14. Further, one or both of the tubes 20A, 20B comprise a bearing material, or may be provided with bearing means (not shown) to enhance the durability of the tubes 20A, 20B.

Suitable securing means 22 are used to secure the tubes 20A, 20B to the steering arm 12 and tie rod 14 to prevent inadvertent longitudinal movement of the sensing devices 10 along either the tie rod 14 or steering arm 12. In the preferred embodiment, the securing means 22 comprise a plurality of clamp members 24, such as known automotive hose clamps for example. The clamp members 24 are typically provided with an adjustment mechanism 26 for changing the diameter of the clamp member 24. The clamp member 24 preferably comprises a robust material, such as stainless steel for example, that is somewhat weather and heat resistant.

The clamp members 24 are provided with a receiving portion 28 (best seen in FIG. 2) for coupling the devices 10 to the securing means 22. In the preferred embodiment, the receiving portion 28 comprises a spherical rod-end that retains a threaded rod member 30, as is known in the art. While the rod member 30 is shown exploded out the rod-end 28, it is to be understood that the rod 30 is typically integrally retained in the rod-end 28 by such means as a ball-joint coupling, for example. The rod member 30 is threadably coupled to a distal end 32 of each of the tubes 20A, 20B and extends parallel thereto.

Each of the tubes 20A, 20B has a pair of diametrically opposed apertures 34 disposed therethrough. The apertures 34 are positioned on the tubes 20A, 20B, so that the tubes 20A, 20B can be slid relative to each other to align the apertures 34 and form a channel 36, that extends through the tubes 20A, 20B. When the channel 36 is intact, the apertures 34 are aligned, and therefore the tubes 20A, 20B are in alignment.

An alignment sensing means 38 of an alignment sensing circuit 40 (shown in FIG. 3) coupled to the tubes 20A, 20B includes an annular member 42 that is secured about the outer tube 20A of the device 10 using known means. If the annular member 42 comprises a suitable metal, the member may be affixed to the outer tube 20A by press-fitting or welding, for example. If the member 42 comprises a suitable plastic material, the member 42 may be affixed to the outer tube 20A using a commercially available epoxy or other adhesive. The annular member 42 is provided to position a signal emitting means 44 over a selected one of the apertures 34 and position a signal detection means 46 over the remaining aperture 34. The annular member 42 prevents the emitting means 44 and detection means 46 from inadvertently moving about on the tube 20A, so that the sensing circuit 40 functions properly.

In the preferred embodiment, the emitting means 44 comprises a suitable signal emitting device, such as a well known light emitting diode (LED) and the detection means 46 comprises an appropriate device for sensing the signal, such as a commercially available photo-transistor. However, it is to be understood that the sensing means 38 may alternatively comprise a known device (not shown) capable of producing a magnetic field, for example. The device may have a first component for producing the magnetic field, secured to the inner periphery of the one of the tubes 20A, 20B and a second component for detecting the magnetic field secured to the inner periphery of the remaining tube 20A, 20B, for sensing when the tubes 20A, 20B are out of alignment. If the alignment sensing means 38 is secured inside of the tubes 20A, 20B, apertures 34 would not be formed through the tubes 20A, 20B. In a further alternative embodiment, an electrical, electro-mechanical, or mechanical switch means (also not shown) may be secured to the inner periphery of one of the tubes 20A, 20B and activation means would be secured to the inner periphery of the other tube 20A, 20B. The switch means and activation means would be installed and operated using well known methods.

A locking member 48 may be threadably coupled to at least one of the rod members 30. The locking member 48 is provided to prevent the tubes 20A, 20B from inadvertently sliding relative to each other after they are in an initial aligned position when coupled to the steering assembly 16. The locking member 48 preferably comprises a nut 48 that threadably couples to the rod 30. The nut 48 is threaded either clockwise or counterclockwise along the rod 30 to either tighten or loosen the nut 48 against the tube's distal end 32.

A pliable cover member 50 (shown in FIG. 1) may be secured about each sensing device 10, for substantially encasing the device 10. The cover member 50 preferably extends between the distal end 32 of each tube 20A, 20B, and around the tubes 20A, 20B, annular member 42, and other components (to be discussed hereafter) to encase them. The cover member 50 may comprise a suitable heat and wear resistant pliable material, such as rubber, to inhibit dirt and grime from collecting on the device 10. The cover member 50 further inhibits the tubes 20A, 20B from rotating relative to each other.

Referring now to FIG. 3 of the drawings, there is shown the alignment sensing circuit 40 of the present invention. The circuit 40 includes the alignment sensing means 38 that includes the signal emitting means 44 and signal detection means 46 as previously discussed. The circuit 40 includes a monitor module 52 that includes a power source 54. The power source 54 may either comprise a 12 volt battery as is commonly found in automobiles or a battery contained in the system. The power source 54 provides a DC voltage to the circuit 40 and is coupled to a commercially available voltage regulator 56, that converts the DC voltage supplied by the power source 54, to a 5V DC voltage level.

The regulator 56 supplies the 5V DC to a suitable monitoring device 58, for powering the device 58. The monitor device 58 may comprise any commercially available integrated circuit semiconductor device that is capable of performing the various functions necessitated by the present invention, to be discussed hereafter. The monitoring device 58 is coupled to the emitting means 44 and detection means 46 for controlling the activation thereof. The monitor device 58 is further coupled to a suitable countdown timer 60, such as a well known 555 timer, as fabricated by various manufacturers. The timer 60 should be capable of deactivating the device 58 after the countdown time period expires.

Referring now to FIG. 3 and FIG. 4, the components of the monitor module 52, such as the device 58, timer 60, as well as additional components to be discussed hereafter, are preferably retained in a housing 62 that is secured in a cabin (not shown) of the vehicle. The housing 62 is preferably retained in the vehicle's cabin so that an operator of the vehicle can easily access the module 52. A printed circuit board 64 may be retained in the housing 62. The circuit board 64 is provided for coupling the electronic components, such as the monitor device 58 and timer 60, of the present invention together.

In the preferred embodiment, the monitor module 52 includes a display module 66 that is coupled to the monitor device 58. The display module 66 comprises a normally open switch means 68 and an indicating means 70. The switch 68 may comprise a suitable normally-open type switch mechanism, such as a push-button type switch for example. The indicating means 70 is coupled to the monitor device 58 and to the switch 68. In the preferred embodiment, the indicating means 70 comprises a light emitting diode that is preferably capable of emitting green light, then emitting red light. Alternatively, the indicating means 70 may comprise a pair of LEDs, with one LED emitting red light and the other LED preferably emitting green light.

The monitor device 58 may be coupled to the emitting means 44 and detection means 46 using known wire conductors 72 and methods for coupling the device 58 to the emitting and detection means 44, 46. Alternatively, the monitor device 58 may be coupled to the emitting means 44 and detection means 46 through wireless connections. With wireless connections, a first radio frequency transceiver 74 is coupled to the monitor device 58, and a second radio frequency transceiver 76 is coupled to the alignment sensing means 38. The device 58 sends a signal to the first transceiver 74, when the device 58 is activated. After the first transceiver 74 receives the signal, the transceiver 74 sends the signal to the second transceiver 76, for activating the sensing means 38. When the detection means 46 is active, the second transceiver 76 receives the signal from the means 46, then transmits the signal to the first transceiver 74. The device 58 then receives the signal from the first transceiver 74. When wireless connections are used, an additional power source 54 may be coupled to the second transceiver 76 and to the sensing means 38 for supplying power thereto.

Figure 5:
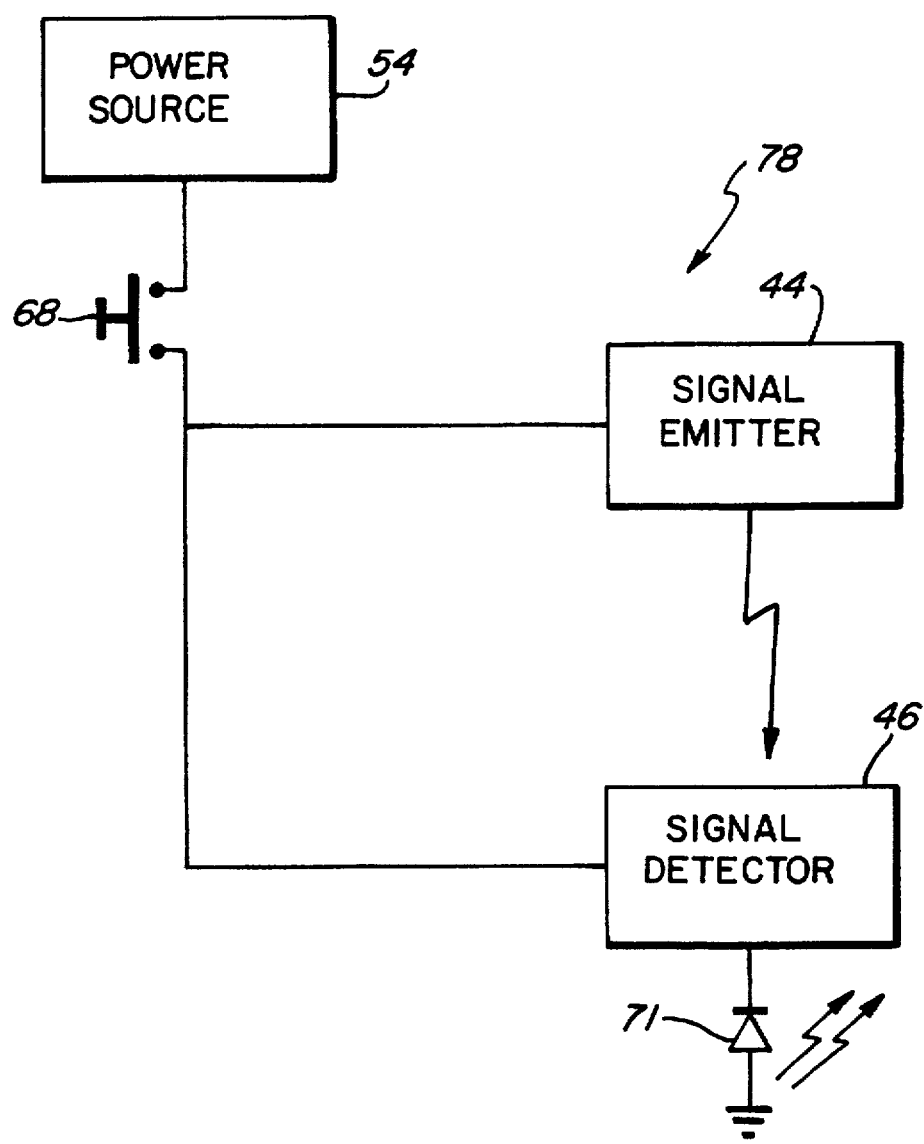
FIG. 5 is a block diagram of an alignment test circuit of the present invention.

Referring now to FIGS. 1, 2, and 5 of the drawings, an alignment test circuit 78 may be provided for determining if the apertures 34, and thus the tubes 20A, 20B are aligned, when the sensing devices 10 are installed. The test circuit 78 would be secured to the distal end 32 of one of the tubes 20A, 20B with an annular member 42, as discussed regarding the alignment sensing means 38. The annular member 42 would be surrounded by the cover member 50 to protect the member 42 and test circuit 78.

The test circuit 78 includes a normally open switch, such as a push-button switch 68 for activating the circuit 78. The switch 68 is coupled to the power source 54, as previously discussed, to provide power to the circuit 78, and to the emitting means 44 for activation thereof. The circuit 78 further includes an indicating means 71, such as an LED that emits red light, for example. The LED 71 is coupled to the detection means 46 and to the switch 68.

In use, the switch 68 of the test circuit 78 is depressed and activates the emitting means 44. The emitting means 44 transmits a signal through the channel 36 for activating the detection means 46. If the detection means 46 is activated by the emitting means 44, the detection means 46 provides a signal to the LED 71, to indicate that the apertures 34 are aligned. If the LED 71 is not activated, the tubes 20A, 20B are adjusted until the detection means 46 activates the LED 71.

Referring now to the drawing Figures, the alignment monitoring system of the present invention is initialized by first, adjusting the steering arm 12 and tie rod 14, as well as any necessary components, of the steering assembly 16 until the front wheels are aligned, as is well known in the art. A sensing device 10 is then coupled between each steering arm 12 and the adjacent tie rod 14, by first affixing the securing means 22 to the arm 12 and tie rod 14. Each of the rod members 30 are then threaded into the ends 32 of the tubes 20A, 20B. It is to be understood that the rods-ends 28 may or may not be integrally coupled to the securing means 22, and may be affixed to the securing means 22, after the securing means 22 are affixed to the steering assembly 16. Additionally, any appropriate methods can be used for coupling the devices 10 to the arm 12 and tie rod 14, so long as the devices 10 are freely movable, while inadvertent longitudinal movement between the devices and steering assembly 16 is prevented. Thus, none of the steering assembly's components are altered in any way and securing the sensing devices 10 of the present invention to the assembly 16 is substantially facile.

If it is desired to monitor the alignment of the vehicle's rear wheels, each sensing device 10, or additional sensing devices 10, can be secured to a rear wheel hub and to a suitable adjacent location, such as a position on the vehicle's frame, for example. The devices 10 can be secured to the vehicle's frame and wheel hub, or other preferable location, using any known method.

The rods 30 are then threadably adjusted to slide the tubes 20A, 20B relative to each other until the channel 36 extends through the tubes 20A, 20B, to indicate that the tubes 20A, 20B are aligned, corresponding to the aligned condition of the associated front wheel. The nut 48 is then tightened against the distal end 32 of the associated tube 20A, 20B, to prevent movement between the rod 30 and the tube 20A, 20B, to aid with retaining the tubes 20A, 20B in their initial aligned position. The remaining sensing device 10 is then adjusted similarly. Thus, proper installation and verification of the aligned condition of the sensing devices 10 is assured. A suitable position in the vehicle's cabin is then located, and the housing 62 is installed in the cabin using known means. The monitor device 58 is then coupled to the emitting and detection means 44, 46 as previously discussed. The vehicle is then operated normally for a desired time period.

If the operator of the vehicle wishes to verify that the front wheels of the vehicle are still aligned, the operator positions the vehicle on a substantially level surface. A steering wheel (not shown) coupled to the steering assembly 16 is then rotated in either a clockwise or counterclockwise direction, to rotate the front wheels in the desired direction, until the front wheels are positioned substantially left or right. The switch 68 of the monitor module 52 is then depressed and released to activate the monitor device 58. Upon activation of the device 58, the timer 60 begins counting down a predetermined activation time period, such as one or more minutes, until the device 58 is deactivated. Therefore, the system of the present invention is not constantly active and will not continuously draw power from the battery 54. While the device 58 is active, the LED 70 preferably emits green light, and possibly flashes, to indicate that the system is active.

The detection means 46 are not immediately activated by the emitting means 44, since the tubes 20A, 20B of one of the devices 10 are slid substantially outwardly relative to each other and the tubes 20A, 20B of the remaining device 10 are slid substantially inwardly relative to each other. The steering wheel is then rotated in the opposite direction for changing the front wheels from the position of substantially left or right to the remaining position.

As the front wheels are being rotated, the steering arms 12 cause the tubes 20A, 20B of each device 10 to slide relative to each other. As the tubes 20A, 20B are sliding, at some point the apertures 34 will begin coming into alignment. As soon as the apertures 34 are aligned sufficiently to at least partially form the channel 36, the detection means 46 are activated by the signal transmitted through the channel 36 from the emitting means 44. Upon activation, each detection means 46 transmits the signal to the monitor device 58. The monitor device 58 determines if the signals were simultaneously received from the detection means 46 and continues to sense the signal transmitted from each detection means 46.

As the wheels continue to rotate, the apertures 34 become more aligned until the channel 36 is substantially formed and the apertures 34, and thus the tubes 20A, 20B, are in their initial position. The front wheels continue to be rotated until they are fully in the remaining position. As the wheels are rotated, the tubes 20A, 20B of the devices 20 are slid relative to each other until the apertures 34 are drawn out of alignment and the channel 36 closes. Once the channel 36 closes, each detection means 46 is no longer activated by its associated emitting means 44, and terminates transmission of the signal to the monitor device 58. The monitor device 58 determines if the signals from the detection means 46 were simultaneously terminated.

If the signal from each of the detection means 46 is simultaneously received, sensed, and terminated, as determined by the monitor device 58, then the apertures 34 in each of the devices 10 are simultaneously aligned, and therefore the front wheels are aligned. If the signal is received from one of the detection means 46, prior to receiving the signal from the other detection means 46, or if the transmission of the signal is not simultaneously terminated by each detection means 46, then the apertures 34 in the devices 10 are not simultaneously aligned, and the front wheels are out of alignment.

Therefore, if the LED 70 continuously emits green light, the front wheels are still in alignment. If the LED 70 emits red light, the front wheels are of alignment during the time period and the alignment condition of the front wheels should be checked by an alignment professional. The LED 70 would continue to emit red light from time that it began emitting red light until the countdown time period determined by the timer 60 expires and the device 58 is deactivated. Thus, the operator of the vehicle can check the alignment condition of the vehicle whenever it is desired, therefore reducing abnormal tire wear and unsafe vehicle operating conditions.

If it is desired to monitor the alignment of the vehicle's rear wheels, each sensing device 10 is coupled to the rear wheel as previously discussed. Alignment of the wheels can be tested by depressing and releasing the switch 68 of the monitor module 52 to activate the emitting means 44. If the detection means 46 activates the LED 70, then the associated rear wheel is aligned. If the LED 70 is not activated, the wheels require inspection by an alignment professional.

Thus, there has been described an improved system for monitoring the alignment condition of a vehicle's front wheels, according to the principles of the present invention. The system includes a pair of alignment sensing devices that can be simply installed without altering the components of the steering assembly. The sensing system can be activated whenever desired by an operator of the vehicle. The system is active for only a brief time period, so that it does not deteriorate the system's power source. The sensing system provides a first signal, such as the LED emitting green light, to indicate that the front wheels are aligned and a second signal, such as the LED emitting red light, to indicate that the front wheels are not aligned. Alignment is verified when the operator rotates a steering wheel in a desired direction, then activates the system. The operator then rotates the steering wheel in the other direction, with the system active. After the front wheels are positioned in the remaining direction, the sensing system provides the appropriate indication depending upon the aligned condition of the front wheels.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. In a vehicle having a steering assembly that includes a pair of steering arms, each of said arms movably coupled at either end thereof to a steering tie rod and to a front wheel for simultaneously changing the direction of the front wheels, a system for monitoring alignment of the front wheels comprising:

a pair of alignment sensing devices, one sensing device extending between each steering arm and the tie rod coupled to said arm, each of said sensing devices comprising;

a pair of concentric tubes retained in a slidable relationship, a distal end of one of said tubes coupled to an adjacent tie rod and a distal end of the remaining tube coupled to an adjacent steering arm.

signal emitting means coupled to one of said tubes, said signal emitting means adapted to transmit a first signal.

signal detection means coupled to one of said tubes and diametrically opposed to said emitting means, said detection means transmitting a second signal when activated by the first signal; and activation means for simultaneously activating the emitting means in each of said sensing devices, said activation means including indicating means for sensing the second signal transmitted by said detection means, whereby said activation means simultaneously activates each of said emitting means so that each of said emitting means simultaneously transmits the first signal, each of said detection means transmitting the second signal upon activation by the first signal, said indicating means providing a first indication when the second signal is simultaneously received from each of said detection means and simultaneously terminated by each of said detection means to indicate that each of said sensing devices are simultaneously aligned and providing a second indication when the second signal from each of said detection means is not a desired one of simultaneously received, or simultaneously terminated, or both, from each of said detection means to indicate that said sensing devices are not simultaneously aligned.

2. The system of claim 1 further comprising adjustment means for slidably adjusting at least one of said concentric tubes relative to the other tube for aligning apertures to form a channel, said adjustment means including retaining means for preventing relative movement between said tubes and said adjustment means.

3. The system of claim 1 further comprising a pair of test means, one test means coupled to each of said sensing devices, said test means activating said emitting means so that said emitting means transmits the first signal, said test means coupled to said detection means for receiving the second signal therefrom when activated by said emitting means for determining if said sensing devices are aligned when said sensing devices are initially coupled to said steering assembly.

4. The system of claim 3 further comprising flexible cover means encasing said tubes and said test means for inhibiting dirt and grime from collecting thereon.

5. In a vehicle having a steering assembly that includes a pair of steering arms, each of said arms movably coupled at either end thereof to a steering tie rod and to a front wheel for simultaneously changing the direction of the front wheels, a system for monitoring alignment of the front wheels comprising:

securing means affixed to each of said steering arms and to a tie rod coupled to each of said arms;

a pair of alignment sensing devices movably coupled to said securing means, one sensing device extending obtusely between each steering arm and the tie rod coupled to said arm, said sensing devices coupled to said securing means when the front wheels are aligned, each of said sensing devices comprising;

a pair of hollow concentric tubes retained in a slidable relationship, a distal end of one of said tubes coupled to the securing means affixed to said tie rod and a distal end of the remaining tube coupled to the securing means affixed to said steering arm, each of said tubes having a pair of diametrically opposed apertures disposed therethrough adjacent to a proximal end of each of said tubes, such that a desired one of said tubes may be slid relative to the other to align said apertures to form a channel that extends through said tubes, adjustment means threadably coupled to the distal end of at least one of said tubes for slidably adjusting a desired one of said tubes relative to the other tube for aligning said apertures to form said channel, said adjustment means including retaining means for preventing relative movement between said adjustment means and said tubes, signal emitting means coupled to an outer periphery of said outer tube and positioned over a selected one of said apertures, said signal emitting means adapted to transmit a first signal through said aperture and through said channel, signal detection means coupled to the outer periphery of said outer tube and positioned over the remaining aperture, said detection means activated by said emitting means to transmit a second signal, test means for determining if said apertures are aligned, said test means activating said emitting means to transmit the first signal and coupled to said detection means to receive the second signal therefrom, said test means receiving the second signal from said detection means indicating that the apertures in said tubes are aligned; and activation means for simultaneously activating the emitting means in each of said sensing devices, said activation means including indicating means for sensing the second signal, whereby said activation means activates said emitting means so that each of said emitting means simultaneously transmits the first signal, each of said detection means transmitting the second signal upon activation by the first signal, said indicating means providing a first indication when the second signal is simultaneously received from each of said detection means and simultaneously terminated by each of said detection means to indicate that the apertures in each of said tubes are simultaneously aligned, thus indicating that the front wheels are aligned and providing a second indication when the second signal from each of said detection means is not a desired one of simultaneously received, or simultaneously terminated, or both, from each of said detection means to indicate that the front wheels are not aligned.

6. The system of claim 5 wherein said securing means comprises a plurality of clamp members formed complementary to said steering arms and to said tie rod, said securing means affixed to said tie rod and said arms for preventing inadvertent longitudinal movement between said sensing devices and said tie rod and said arm, said securing means including a coupling member for movably coupling the distal end of each of said tubes thereto.

7. The system of claim 6 wherein said adjustment means are integrally coupled to said coupling member and interposed between a distal end of one of said tubes and said securing means, said adjustment means comprising an elongated threaded member threadably coupled to the distal end of at least one of said tubes.

8. The system of claim 5 wherein said activation means comprises;

normally open switch means, said switch means coupled to a power source and coupled to each of said signal emitting means, both of said emitting means transmitting the first signal upon activation by said switch means;

monitor means coupled to each of said signal detection means for receiving the second signal therefrom, said monitor means determining if the second signal was simultaneously received from each of said detection means and simultaneously terminated by each of said detection means, said monitor means providing a first indicating signal when the second signal is both simultaneously received from each of said detection means and simultaneously terminated by each of said detection means and providing a second indicating signal when the second signal is not both simultaneously received from each of said detection means and simultaneously terminated by each of said detection means; and said indicating means coupled to said monitor means, said indicating means comprising at least one light emitting diode, said indicating means providing a first indication when the first indicating signal is received from said monitor means to indicate that the front wheels are aligned and providing a second indication when the second indicating signal is received from said monitor means to indicate that the front wheels are not aligned.

9. The system of claim 8 wherein said indicating means comprises a first light emitting diode adapted to illuminate upon receiving the first indicating signal and a second light emitting diode adapted to illuminate upon receiving the second indicating signal.

10. The system of claim 9 wherein said switch means and said indicating means are located in a cabin of said vehicle for operation of said switch means and viewing of said indicating means by an operator of said system.

11. The system of claim 5 further comprising a pliable cover member encasing said tubes and said test means for inhibiting dirt and grime from collecting thereon.

12. In a vehicle having a steering assembly that includes a pair of steering arms, each of said arms movably coupled at either end thereof to a steering tie rod and to a front wheel for changing the direction of the front wheels, a method for intermittently monitoring alignment of the front wheels comprising the steps of:

adjusting said steering assembly until the front wheels are aligned;

providing a pair of alignment sensing devices, each of said sensing devices including a pair of concentric tubes slidably coupled together and alignment sensing means for sensing when said tubes are aligned;

coupling one of said sensing devices to one of said steering arms and to the tie rod coupled to said arm and coupling the remaining one of said sensing devices to the other steering arm and tie rod coupled to said arm, such that each of said sensing devices extend between each of said steering arms and the adjacent tie rod;

selecting one of said sensing devices and slidably adjusting said tubes until said tubes are aligned to correspond to the front wheels;

selecting the remaining one of said sensing devices and slidably adjusting said tubes until said tubes are aligned;

operating said vehicle for a desired time period;

verifying that the front wheels of said vehicle are still aligned, said verification comprising the steps of, positioning said vehicle on a substantially level surface, providing activation means for activating the alignment sensing means of each of said sensing devices, said activation means including indicating means coupled to said alignment sensing means for indicating that said front wheels are still aligned and for indicating that the front wheels are not aligned, rotating a steering wheel coupled to said steering assembly a desired direction of clockwise and counterclockwise to cause the front wheels to rotate in the desired direction until the front wheels are positioned in a desired one of substantially leftwardly and rightwardly, activating said activation means, rotating said steering wheel in the remaining direction of said clockwise and counterclockwise directions to cause the front wheels to rotate from the position of substantially leftwardly and rightwardly to the remaining position of substantially leftwardly and rightwardly, said alignment sensing means of each of said sensing devices providing first and second signals to said indicating means for indicating that the tubes in each of said devices are simultaneously aligned and that the tubes in each of said devices are not simultaneously aligned to correspond to the alignment condition of the front wheels, said indicating means providing a first indication to indicate that the front wheels are aligned and providing a second indication to indicate that the front wheels are not aligned.

13. The method of claim 12 comprising the further steps of:

a) providing a pair of test means for activating said alignment sensing means, said test means including indicating means;

b) coupling said test means to the alignment sensing means of each of said sensing devices;

c) selecting a sensing device for determining if the tubes therein are aligned;

d) activating said alignment sensing means to determine if said tubes are aligned;

e) slidably adjusting said tubes if said indicating means indicates that said tubes are not aligned;

f) activating said alignment sensing means to determine if said tubes are aligned, the indicating means of said test means providing a first indication to indicate that said tubes are aligned and providing a second indication to indicate that said tubes are out of alignment;

g) repeating steps e and f until said indicating means provides the first indication;

h) selecting the remaining sensing device; and i) repeating steps d through g.

14. The method of claim 12 wherein said alignment sensing means further comprises;

each of said tubes having a pair of diametrically opposed apertures disposed therethrough adjacent to a proximal end thereof, such that a desired one of said tubes may be slid relative to the other to align said apertures to form a channel that extends through said tubes.

15. The method of claim 14 wherein said alignment sensing means further comprises;

signal emitting means coupled to an outer periphery of an outer one of said tubes and positioned over a selected one of said apertures, said signal emitting means adapted to transmit a first signal through said channel; and signal detection means coupled to the outer periphery of said outer tube and positioned over the remaining aperture, said detection means activated by said emitting means to transmit a second signal.

16. The method of claim 15 wherein said activation means further comprises;

normally open switch means, said switch means coupled to a power source and coupled to each of said signal emitting means, both of said emitting means transmitting the first signal upon activation by said switch means;

monitor means coupled to each of said signal detection means for receiving the second signal therefrom, said monitor means determining if the second signal was simultaneously received from each of said detection means and simultaneously terminated by each of said detection means, said monitor means providing a first indicating signal when the second signal is both simultaneously received from each of said detection means and simultaneously terminated by each of said detection means and providing a second indicating signal when the second signal is not both simultaneously received from each of said detection means and simultaneously terminated by each of said detection means; and said indicating means coupled to said monitor means, said indicating means comprising at least one light emitting diode, said indicating means providing a first indication when the first indicating signal is received from said monitor means to indicate that the front wheels are aligned and providing a second indication when the second indicating signal is received from said monitor means to indicate that the front wheels are not aligned.

* * * * *